United States Patent
Kramer et al.

(10) Patent No.: US 7,912,069 B2
(45) Date of Patent: *Mar. 22, 2011

(54) VIRTUAL SEGMENTATION SYSTEM AND METHOD OF OPERATION THEREOF

(75) Inventors: David B. Kramer, Austin, TX (US); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 340 days.

This patent is subject to a terminal disclaimer.

(21) Appl. No.: 11/299,645

(22) Filed: Dec. 12, 2005

(65) Prior Publication Data

US 2006/0088040 A1    Apr. 27, 2006

Related U.S. Application Data

(63) Continuation of application No. 09/822,655, filed on Mar. 30, 2001, now Pat. No. 7,009,979.

(51) Int. Cl.
*H04L 12/28*    (2006.01)
*H04J 3/16*    (2006.01)
*H04J 3/24*    (2006.01)

(52) U.S. Cl. .................. 370/395.52; 370/466; 370/474; 370/401

(58) Field of Classification Search ............... 370/395.1, 370/395.52, 389, 412, 466, 473–474
See application file for complete search history.

(56) References Cited

U.S. PATENT DOCUMENTS

| | | | |
|---|---|---|---|
| 5,764,645 A | 6/1998 | Bernet et al. | |
| 5,802,287 A * | 9/1998 | Rostoker et al. | 370/395.5 |
| 6,052,387 A | 4/2000 | Chow et al. | |
| 6,137,798 A | 10/2000 | Nishihara et al. | |
| 6,477,166 B1 | 11/2002 | Sanzi et al. | |
| 6,614,793 B1 | 9/2003 | Richards et al. | |
| 6,680,933 B1 | 1/2004 | Cheesman et al. | |
| 6,711,167 B1 | 3/2004 | Ikeda et al. | |
| 6,850,516 B2 | 2/2005 | Bennett et al. | |
| 6,920,142 B1 * | 7/2005 | Hodgins et al. | 370/397 |

* cited by examiner

*Primary Examiner* — Nittaya Juntima

(57) ABSTRACT

A virtual segmentation system and a method of operating the same. In one embodiment, the virtual segmentation system includes a protocol data unit receiver subsystem configured to (i) receive at least a portion of a protocol data unit and (ii) store the at least a portion of the protocol data unit in at least one block, and a virtual segmentation subsystem, associated with the protocol data unit receiver subsystem, configured to perform virtual segmentation on the protocol data unit by segmenting the at least one block when retrieved without reassembling an entirety of the protocol data unit.

20 Claims, 4 Drawing Sheets

ELEMENT 420 - PROTOCOL DATA UNIT RECEIVER
ELEMENT 440 - VIRTUAL SEGMENTATION SUBSYSTEM

VIRTUAL SEGMENTATION SYSTEM AND METHOD OF OPERATION THEREOF

CROSS-REFERENCE TO RELATED APPLICATIONS

This application is a continuation of U.S. patent application Ser. No. 09/822,655, entitled "A VIRTUAL SEGMENTATION SYSTEM AND METHOD OF OPERATION THEREOF", filed on Mar. 30, 2001, by David B. Kramer, et al., issued as U.S. Pat. No. 7,009,979. The above-listed application is commonly assigned with the present invention and is incorporated herein by reference as if reproduced herein in its entirety.

This application is also related to the following U.S. patent application Ser. No. 09/798,472 that has now issued as U.S. Pat. No. 6,850,516. The below-listed application is commonly assigned and co-pending with the present invention and is incorporated herein by reference as if reproduced herein in their entirety.

| Patent Application No. | Title | Inventor | Date |
| --- | --- | --- | --- |
| 09/798,472 | A Virtual Reassembly System And Method of Operation Thereof | Bennett, et al. | Filed Mar. 2, 2001 |

TECHNICAL FIELD OF THE INVENTION

The present invention is directed, in general, to a communications system and, more specifically, to a virtual segmentation system and method of operating the same.

BACKGROUND OF THE INVENTION

Communications networks are currently undergoing a revolution brought about by the increasing demand for real-time information being delivered to a diversity of locations. Many situations require the ability to transfer large amounts of data across geographical boundaries with increasing speed and accuracy. However, with the increasing size and complexity of the data that is currently being transferred, maintaining the speed and accuracy is becoming increasingly difficult.

Early communications networks resembled a hierarchical star topology. All access from remote sites was channeled back to a central location where a mainframe computer resided. Thus, each transfer of data from one remote site to another, or from one remote site to the central location, had to be processed by the central location. This architecture is very processor-intensive and incurs higher bandwidth utilization for each transfer. This was not a major problem in the mid to late 1980s where fewer remote sites were coupled to the central location. Additionally, many of the remote sites were located in close proximity to the central location. Currently, hundreds of thousands of remote sites are positioned in various locations across assorted continents. Legacy networks of the past are currently unable to provide the data transfer speed and accuracy demanded in the marketplace of today.

In response to this exploding demand, data transfer through networks employing distributed processing has allowed larger packets of information to be accurately and quickly distributed across multiple geographic boundaries. Today, many communication sites have the intelligence and capability to communicate with many other sites, regardless of their location. This is typically accomplished on a peer level, rather than through a centralized topology, although a host computer at the central site can be appraised of what transactions take place and can maintain a database from which management reports are generated and operation issues addressed.

Distributed processing currently allows the centralized site to be relieved of many of the processor-intensive data transfer requirements of the past. This is typically accomplished using a data network, which includes a collection of routers. The routers allow intelligent passing of information and data files between remote sites. However, increased demand and the sophistication required to route current information and data files quickly challenged the capabilities of existing routers. Also, the size of the data being transmitted is dramatically increasing. Some efficiencies are obtained by splitting longer data files into a collection of smaller, somewhat standardized cells for transmission or routing. However, these efficiencies are somewhat offset by the processing required to route and split data files (segmentation) or process the cells at nodes within the network.

More specifically, the physical segmentation of data files process requires the system to physically reassemble an entire protocol data unit (data file) encapsulated in the cells before routing and segmentation can be performed on the protocol data unit. This physical reassembly process increases the processing time and therefore decreases the throughput of the router. In view of the ever increasing demand for higher transmission speeds this is highly undesirable.

Accordingly, what is needed in the art is a system to overcome the deficiencies of the prior art.

SUMMARY OF THE INVENTION

To address the above-discussed deficiencies of the prior art, the present invention provides a virtual segmentation system and a method of operating the same. In one embodiment, the virtual segmentation system includes (1) a protocol data unit receiver subsystem configured to (i) receive at least a portion of a protocol data unit and (ii) store the at least a portion of the protocol data unit in at least one block, and (2) a virtual segmentation subsystem, associated with the protocol data unit receiver subsystem, configured to perform virtual segmentation on the protocol data unit by segmenting the at least one block when retrieved without reassembling an entirety of the protocol data unit.

In another embodiment, the present invention provides a method of operating a virtual segmentation system, including (1) receiving at least a portion of a protocol data unit, (2) storing the at least a portion of the protocol data unit in at least one block and (3) performing virtual segmentation on the protocol data unit by segmenting the at least one block when retrieved without reassembling an entirety of the protocol data unit.

In another embodiment, the present invention provides another virtual segmentation system, including (1) a protocol data unit receiver subsystem configured to (i) receive at least a portion of a protocol data unit and (ii) store the at least a portion of the protocol data unit in at least one block and (2) a virtual segmentation subsystem, associated with the protocol data unit receiver subsystem, configured to perform virtual segmentation on the protocol data unit by segmenting the at least one block when retrieved, the segmenting independent of reassembling an entirety of the protocol data unit.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
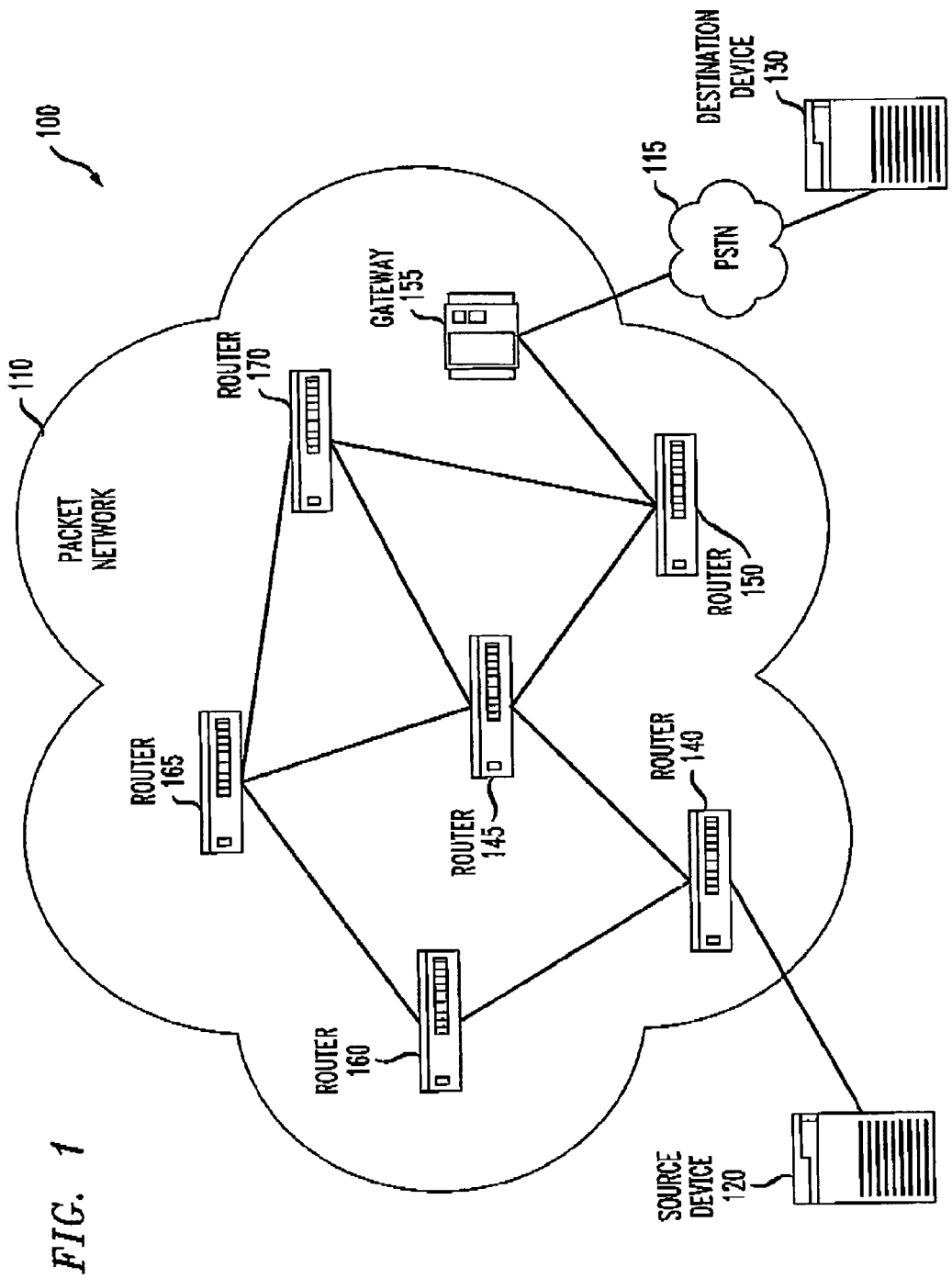
FIG. 1 illustrates a block diagram of an embodiment of a communications network constructed in accordance with the principles of the present invention.

Referring initially to FIG. 1, illustrated is a block diagram of an embodiment of a communications network, generally designated 100, constructed in accordance with the principles of the present invention. The communications network 100 is generally designed to transmit information in the form of a data packet from one point in the network to another point in the network.

As illustrated, the communications network 100 includes a packet network 110, a public switched telephone network (PSTN) 115, a source device 120 and a destination device 130. In the illustrative embodiment shown in FIG. 1, the packet network 110 comprises an Asynchronous Transfer Mode (ATM) network. However, one skilled in the art readily understands that the present invention may use any type of packet network. The packet network 110 includes routers 140, 145, 150, 160, 165, 170 and a gateway 155. One skilled in the pertinent art understands that the packet network 110 may include any number of routers and gateways.

The source device 120 may generate a data packet to be sent to the destination device 130 through the packet network 110. In the illustrated example, the source device 120 initially sends the data packet to the first router 140. The first router 140 then determines from the data packet which router to send the data packet to based upon routing information and network loading. Some information in determining the selection of a next router may include the size of the data packet, loading of the communications link to a router and the destination. In this example, the first router 140 may send the data packet to the second router 145 or fourth router 160.

The data packet traverses from router to router within the packet network 110 until it reaches the gateway 155. In one particular example, the data packet may traverse along a path that includes the first router 140, the fourth router 160, the fifth router 165, the sixth router 170, the third router 150 and finally to the gateway 155. The gateway 155 converts the data packet from the protocol associated with the packet network 110 to a different protocol compatible with the PSTN 115. The gateway 155 then transmits the data packet to the destination device 130 via the PSTN 115. However, in another example, the data packet may traverse along a different path such as the first router 140, the second router 145, the third router 150 and finally to the gateway 155. It is generally desired when choosing a subsequent router, the path the data packet traverses should result in the fastest throughput for the data packet. It should be noted, however, that this path does not always include the least number of routers.

Figure 2:
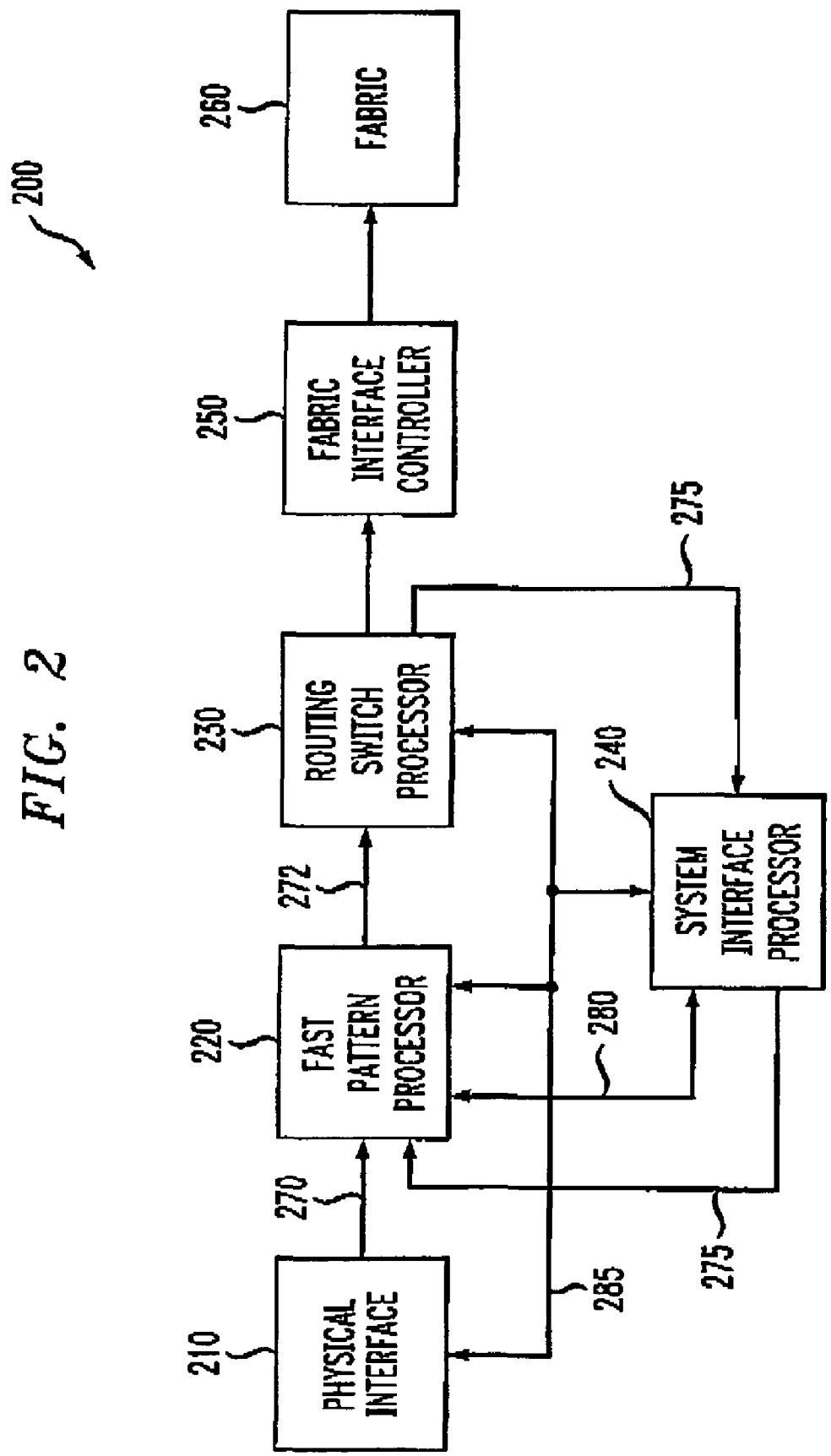
FIG. 2 illustrates a block diagram of an embodiment of a router architecture constructed in accordance with the principles of the present invention.

Turning now to FIG. 2, illustrated is a block diagram of an embodiment of a router architecture, generally designated 200, constructed in accordance with the principles of the present invention. The router architecture 200, in one embodiment, may be employed in any of the routers illustrated in FIG. 1. The router architecture 200 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 2, the router architecture 200 includes a physical interface 210, a fast pattern processor (FPP) 220, a routing switch processor (RSP) 230, and a system interface processor (SIP) 240. The router architecture 200 may also include a fabric interface controller 250 which is coupled to the RSP 230 and a fabric network 260. It should be noted that other components not shown may be included within the router architecture 200 without departing from the scope of the present invention.

The physical interface 210 provides coupling to an external network. In an exemplary embodiment, the physical interface 210 is a POS-PHY/UTOPIA level 3 interface. The FPP 220, in one embodiment, may be coupled to the physical interface 210 and receives a data stream that includes protocol data units from the physical interface 210. The FPP 220 analyzes and classifies the Protocol data units and subsequently concludes processing by outputting packets to the RSP 230.

The FPP 220, in conjunction with a powerful high-level functional programming language (FPL), is capable of implementing complex pattern or signature recognition and operates on the processing blocks containing those signatures. The FPP 220 has the ability to perform pattern analysis on every byte of the payload plus headers of a data stream. The pattern analysis conclusions may then be made available to a system logic or to the RSP 230, allowing processing block manipulation and queuing functions. The FPP 220 and RSP 230 provide a solution for switching and routing. The FPP 220 further provides glueless interfaces to the RSP 230 and the SIP 240 to provide a complete solution for wire-speed processing in next-generation, terabit switches and routers.

As illustrated in FIG. 2, the FPP 220 employs a first communication link 270 to receive the data stream from the physical interface 210. The first communication link 270 may be an industry-standard UTOPIA Level 3/UTOPIA Level 2/POS-PHY Level 3 interface. Additionally, the FPP 220 employs a second communication link 272 to transmit packet and conclusions to the RSP 230. The second communication link 272 may be a POS-PHY Level 3 interface.

The FPP 220 also includes a management path interface (MPI) 275, a function bus interface (FBI) 280 and a configuration bus interface (CBI) 285. The MPI 275 enables the FPP 220 to receive management frames from a local microprocessor. In an exemplary embodiment, this may be handled through the SIP 240. The FBI 280 connects the FPP 220 and the SIP 240, or custom logic in certain situations, for external processing of function calls. The CBI 285 connects the FPP 220 and other devices (e.g., physical interface 210 and RSP 230) to the SIP 240. Other interfaces (not shown), such as memory interfaces, are also well within the scope of the present invention.

The FPP 220 provides an additional benefit in that it is programmable to provide flexibility in optimizing performance for a wide variety of applications and protocols. Because the FPP is a programmable processor rather than a fixed-function ASIC, it can handle new protocols or applications as they are developed as well as new network functions as required. The FPP 220 may also accommodate a variety of search algorithms. These search algorithms may be applied to large lists beneficially.

The RSP 230 is also programmable and works in concert with the FPP 220 to process the protocol data units classified by the FPP 220. The RSP 230 uses the classification information received from the FPP 220 to determine the starting offset and the length of the Protocol data unit payload, which provides the classification conclusion for the Protocol data unit. The classification information may be used to determine the port and the associated RSP 230 selected for the Protocol data unit. The RSP 230 may also receive additional Protocol data unit information passed in the form of flags for further processing.

The RSP 230 also provides programmable traffic management including policies such as random early discard (RED), weighted random early discard (WRED), early packet discard (EPD) and partial packet discard (PPD). The RSP 230 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 230 may provide programmable packet modifications, including adding or stripping headers and trailers, rewriting or modifying contents, adding tags and updating checksums and CRCs. The RSP 230 may be programmed using a scripting language with semantics similar to the C language. Such script languages are well known in the art. Also connected to the RSP 230 are the fabric interface controller 250 and the fabric network 260. The fabric interface controller 250 provide the physical interface to the fabric network 260, which is typically a communications network.

The SIP 240 allows centralized initialization and configuration of the FPP 220, the RSP 230 and the physical interfaces 210, 250. The SIP 240, in one embodiment, may provide policing, manage state information and provide a peripheral component interconnect (PCI) connection to a host computer. The SIP 240 may be a PayloadPlus™ Agere System Interface commercially available from Agere Systems, Inc.

Figure 3:
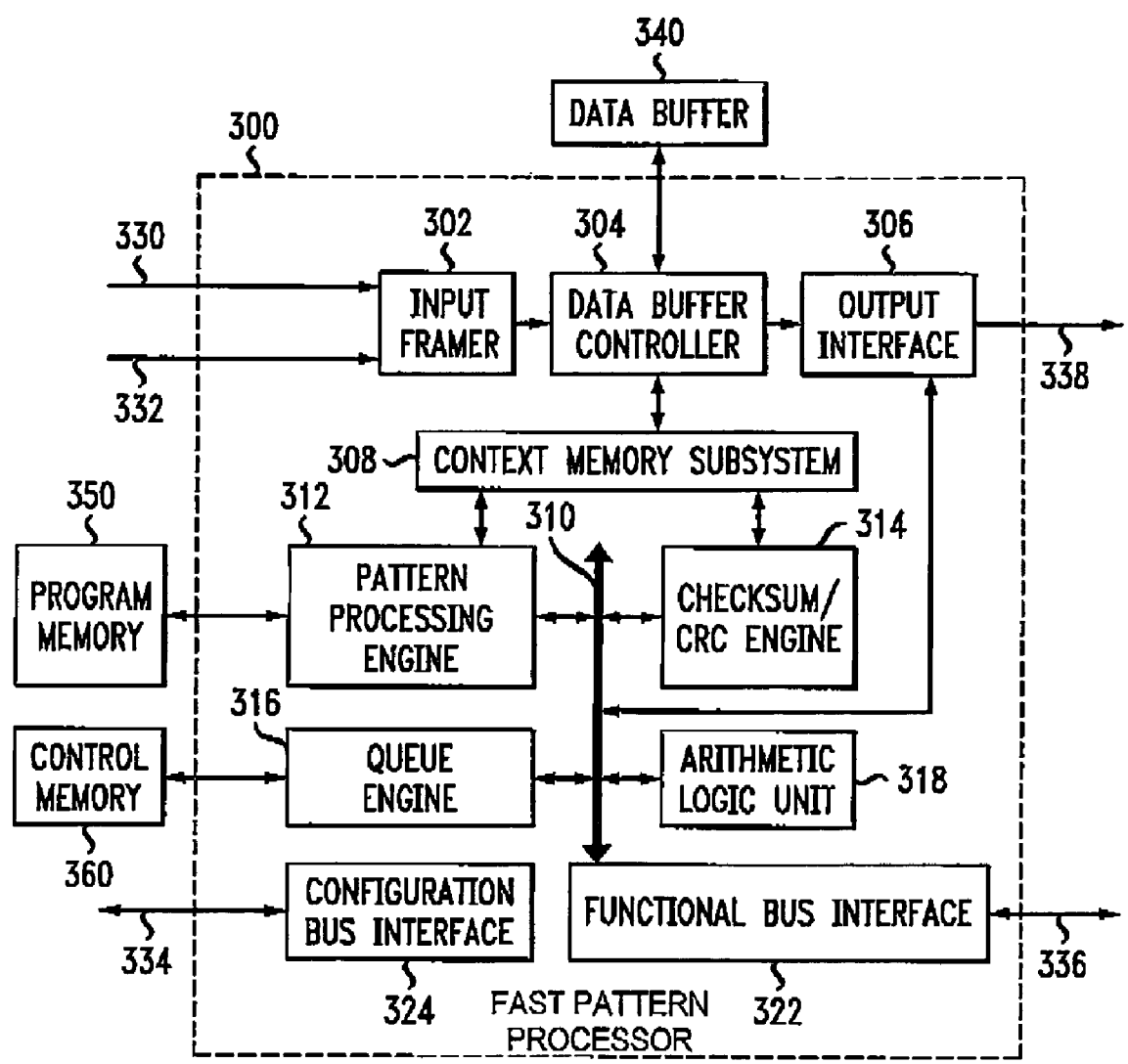
FIG. 3 illustrates a block diagram of an embodiment of a fast pattern processor constructed in accordance with the principles of the present invention.

Turning now to FIG. 3, illustrated is a block diagram of an embodiment of a fast pattern processor (FPP), generally designated 300, constructed in accordance with the principles of the present invention. The FPP 300 includes an input framer 302 that receives protocol data units via external input data streams 330, 332. The input framer 302 frames packets containing the Protocol data units into 64-byte processing blocks and stores the processing blocks into an external data buffer 340. The input data streams 330, 332 may be 32-bit UTOPIA/POS-PHY from PHY and 8-bit POS-PHY management path interface from SIP 240 (FIG. 2), respectively.

Typically, a data buffer controller 304 is employed to store the processing blocks to the external data buffer 340. The data buffer controller 304 also stores the processing blocks and associated configuration information into a portion of a context memory subsystem 308 associated with a context, which is a processing thread. As illustrated, the context memory subsystem 308 is coupled to a data buffer controller 304.

Additionally, the context memory subsystem 308 is coupled to a checksum/cyclical redundancy check (CRC) engine 314 and a pattern processing engine 312. The checksum/CRC engine 314 performs checksum or CRC functions on processing block and on the Protocol data units embodied with the processing block. The pattern processing engine 312 performs pattern matching to determine how Protocol data units are classified and processed. The pattern processing engine 312 is coupled to a program memory 350.

The FPP 300 further includes a queue engine 316 and an arithmetic logic unit (ALU) 318. The queue engine 316 manages replay contexts for the FPP 300, provides addresses for block buffers and maintains information on blocks, Protocol data units, and connection queues. The queue engine 316 is coupled to an external control memory 360 and the internal function bus 310. The ALU 318 is coupled to the internal function bus 310 and is capable of performing associated computational functions.

Also coupled to the internal function bus 310 is a functional bus interface 322. The functional bus interface 322 passes external functional programming language function calls to external logic through a data port 336. In one exemplary embodiment, the data port 336 is a 32-bit connection to the SIP 240 (FIG. 2). The FPP 300 also includes a configuration bus interface 320 for processing configuration requests from externally coupled processors. As illustrated, the configuration bus interface 320 may be coupled to a data port 334, such as an 8-bit CBI source.

Additionally, coupled to the internal function bus 310 is an output interface 306. The output interface 306 sends Protocol data units and their classification conclusions to the downstream logic. The output interface 306 may retrieve the processing blocks stored in the data buffer 340 and send the Protocol data units embodied within the processing blocks to an external unit through an output data port 338. The output data port 338, in an exemplary embodiment, is a 32-bit POS-PHY connected to the RSP 230 (FIG. 2).

Figure 4:
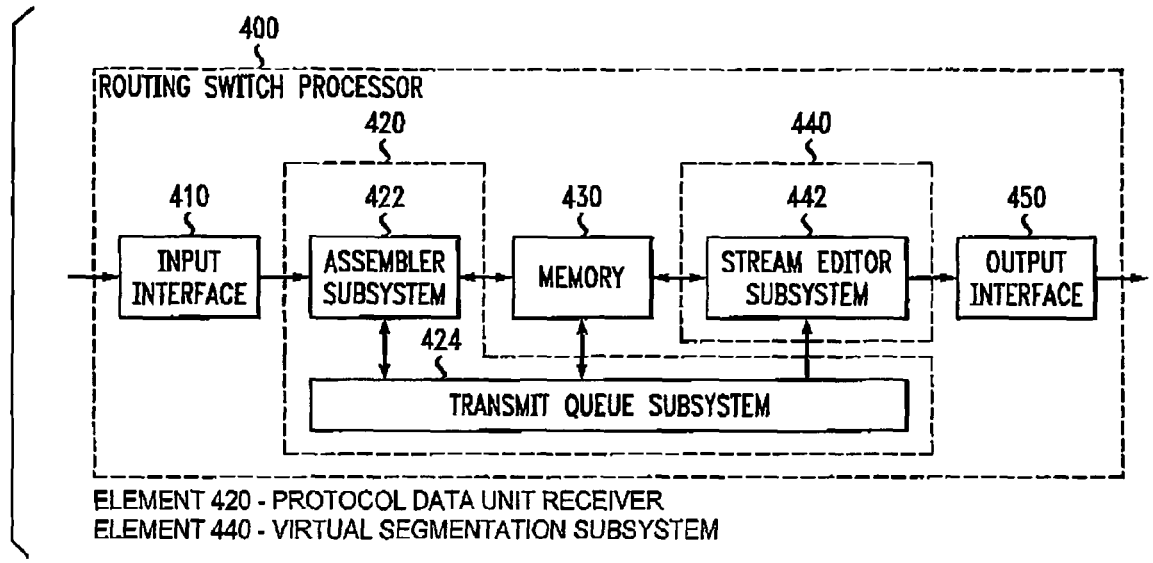
FIG. 4 illustrates a block diagram of an embodiment of a routing switch processor, which may employ the virtual segmentation system, constructed in accordance with the principles of the present invention.

Turning now to FIG. 4, illustrated is a block diagram of an embodiment of a routing switch processor, generally designated 400, that employs a virtual segmentation system and is constructed in accordance with the principles of the present invention. The present invention provides a virtual segmentation system that advantageously allows a protocol data unit to be stored in non-contiguous blocks of memory and then perform segmentation on the protocol data unit without recreating (physically reassembling) the entire protocol data unit in a contiguous portion of memory. For purposes of the present invention, a "protocol data unit" is the underlying message in a specific protocol that may be transmitted via packets over a network. For example, a protocol data unit may be an Internet Protocol ("IP") message that is transmitted over an Asynchronous Transfer Mode ("ATM") network. In an ATM network, the IP message is broken into ATM cells (packets) before transmission over the ATM network. Of course, however, a protocol data unit may be any protocol message transmitted over a network and a packet may be a portion of the protocol data unit or the entire protocol data unit.

The routing switch processor 400 is configured to receive a protocol data unit from an input processor (not shown), such as the fast pattern processor 220 of FIG. 2. The routing switch processor 400 also transmits at least a portion of the protocol data unit to a network via a network interface (not shown), such as the fabric interface controller 250 of FIG. 2. For the purposes of the present invention, the phrase "configured to" means that the device, the system or the subsystem includes the necessary software, hardware, firmware or a combination thereof to accomplish the stated task.

In the illustrated embodiment, the routing switch processor 400 includes an input interface 410, a protocol data unit receiver subsystem 420, a memory 430, a virtual segmentation subsystem 440 and an output interface 450. The input interface 410 receives the protocol data units to be processed. In one embodiment, the input interface 410 receives the protocol data units from an input processor, such as the fast pattern processor 420. The input interface 410 may also receive classification information or routing information associated with each protocol data unit. In another embodiment, the input interface 410 may also send routing information or transmit commands to the protocol data unit receiver subsystem 420.

The protocol data unit receiver subsystem 420 is configured to receive at least a portion of a protocol data unit and assemble the protocol data unit. The protocol data unit receiver subsystem 420 also stores the protocol data unit in blocks in the memory 430. In one embodiment, the protocol data unit receiver subsystem 420 is further configured to process a plurality of interleaved portions of different protocol data units.

In the illustrated embodiment, the protocol data unit receiver subsystem 420 includes an assembler subsystem 422 and a transmit queue subsystem 424. The assembler subsystem 422 is configured to receive at least a portion of the protocol data unit from the input interface 410. The assembler subsystem 422 also assembles each protocol data unit and stores the assembled protocol data unit in at least one block in the memory 430. In one embodiment, the assembler subsystem 422 may request the transmit queue subsystem 424 to allocate space in the memory 430 for each protocol data unit.

The transmit queue subsystem 424 is configured to maintain a linked list of each block associated with each of the protocol data units. In another embodiment, the transmit queue subsystem 424 may maintain a linked list for each block of a protocol data unit stored in the memory 430. The transmit queue subsystem 424 is also configured to perform a router function on the protocol data unit contained within the blocks and maintain at least one queue for transmission of the protocol data unit. In one embodiment, the assembler subsystem 422 and the transmit queue subsystem 424 are further configured to process a plurality of interleaved portions of different protocol data units.

The virtual segmentation subsystem 440 is associated with the protocol data unit receiver subsystem 420 and is configured to perform virtual segmentation on the protocol data unit. For example, the protocol data unit receiver subsystem 420 stores portions of the protocol data unit in blocks as it is received. The blocks associated with the protocol data unit may not be stored in contiguous locations and may have multiple blocks from different protocol data units interleaved between them. Instead of retrieving and physically reassembling the entire protocol data unit before segmenting the protocol data unit, the virtual segmentation subsystem 440 advantageously performs the segmentation on each block as it is retrieved. The segmentation may include converting the block to the appropriate transmission protocol and append header information. For example, if the protocol data unit is an IP message, the virtual segmentation subsystem 440 retrieves each block of the IP message, stores a portion of the IP message in an ATM cell, adds an ATM cell header and transmits the ATM cell. Of course, however, the present invention is not limited to the type of segmentation described above. In other embodiments, the present invention may perform additional or other steps than described above. Additionally, the virtual segmentation subsystem may be further configured to process a plurality of interleaved portions of different protocol data units.

In the illustrated embodiment, the virtual segmentation subsystem 440 may also include a stream editor subsystem 442 configured to perform virtual segmentation. The stream editor subsystem 442, in one embodiment, is also configured to perform packet modification on the protocol data units as they are being sent to the output interface 450 for transmission. The modifications may include modifying the protocol data unit to implement IP and upper layer protocols, encapsulating the protocol data unit into AAL5 protocol data units and converting or segmenting the protocol data unit into ATM cells with the appropriate header information.

Additionally, the stream editor subsystem 442 may be configured to convert between a first protocol and a second protocol. In another embodiment, the stream editor subsystem 442 may be further configured to generate a validity check on the protocol data unit or on at least a portion of the protocol data unit. The validity checks may be a cyclic redundancy check (CRC), a CRC for asynchronous transfer mode (ATM) adaptive layer 5 (AAL5) over ATM, and a CRC-10 for operation, administration, maintenance (OAM) cells. Of course, however, the present invention is not limited to the validity checks or functions listed above. In other embodiments, the stream editor subsystem 442 may perform any type of validity check, any type of function or any type of modification associated with the transmission of protocol data units.

The output interface 450 receives the virtually segmented protocol data units from the virtual segmentation subsystem 440 and transmits at least a portion of the protocol data unit to a network via a network interface (not shown), such as the fabric interface controller 250 of FIG. 2. In another embodiment, the output interface 450 may be coupled to a plurality of network interfaces that allow the protocol data units to be routed to different networks or communication links associated with each network interface.

One skilled in the art should know that the present invention is not limited to a virtual segmentation system within a routing switch processor. Nor is the present invention limited to the types of processing described above. In other embodiments, the virtual segmentation system may be employed in other devices that process protocol data units.

Figure 5:
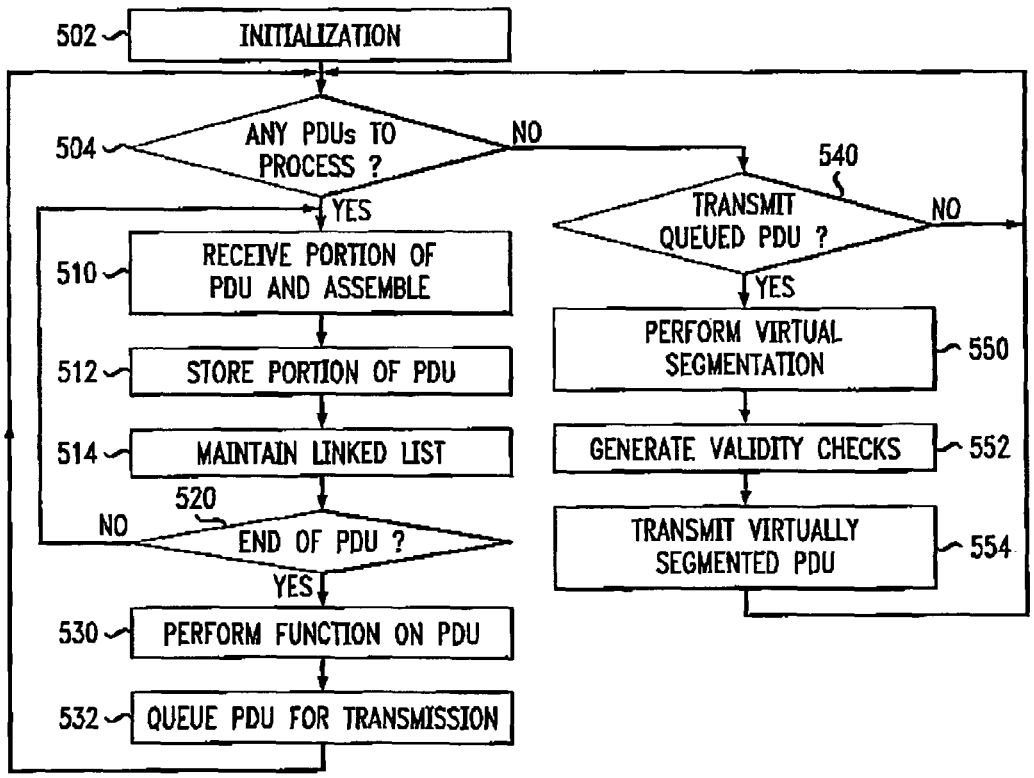
FIG. 5 illustrates a flow diagram of an embodiment of a method of operating a virtual segmentation system constructed in accordance with the principles of the present invention.

Turning now to FIG. 5, illustrated is a flow diagram of an embodiment of a method, generally designated 500, of operating a virtual segmentation system constructed in accordance with the principles of the present invention. In FIG. 5, the virtual segmentation system first performs initialization in a step 502.

After initialization, the virtual segmentation system determines if there are any protocol data units to process in a decisional step 504. If there is a protocol data unit to process, the virtual segmentation system receives at least a portion of the protocol data unit and assembles the protocol data unit in a step 510. Next, the virtual segmentation system stores the protocol data unit or at least the portion of the protocol data unit in blocks in memory in a step 512. The virtual segmentation system may then maintain a linked list associated with the protocol data unit in a step 514. In one embodiment, the virtual segmentation system maintains a linked list of each of the blocks associated with the protocol data unit.

The virtual segmentation system then determines if the portion received is the end of the protocol data unit in a decisional step 520. If it is not the end of the protocol data unit, the virtual segmentation system then returns to receive and process another portion of the protocol data unit in the step 510. If it is the end of the protocol data unit, the virtual segmentation system then performs a function on the protocol data unit in a step 530. In one embodiment, the virtual segmentation system may perform router related functions on the protocol data unit, such as quality of service checks and validity checks. In another embodiment, the virtual segmentation system may perform a function on selected protocol data units or the virtual segmentation system may not perform any function. Next, the virtual segmentation system maintains a queue structure for the protocol data unit for transmission in a step 532. The virtual segmentation system then returns to process the next protocol data unit in the decisional step 504.

If the virtual segmentation system did not have any protocol data units to process in the decisional step 504, the virtual segmentation system then determines if there is a queued protocol data unit to transmit in a decisional step 540. If there are no queued protocol data units to transmit, the virtual segmentation system then returns to process the next protocol data unit in the decisional step 504.

If there is a queued protocol data unit to transmit, the virtual segmentation system performs virtual segmentation on the protocol data unit in a step 550. Virtual segmentation is discussed in more detail in FIG. 4. In one embodiment, the virtual segmentation may include converting between a first protocol and a second protocol. Next, the virtual segmentation system may then generate validity checks in a step 552. In one embodiment, the validity checks may be a CRC, a CRC for AAL5 over ATM and a CRC-10 for OAM cells. In another embodiment, the validity checks may be generated as part of the virtual segmentation process and a validity check is generated for each generated segment.

Next, the virtual segmentation system may transmit the virtually segmented protocol data unit in a step 554. In one embodiment, the virtual segmentation system may transmit each segmented portion of the protocol data unit as it is being virtually segmented. In another embodiment, the virtual segmentation system may transmit or route the virtually segmented protocol data unit to different network interface controllers depending upon routing information associated with the protocol data unit. The virtual segmentation system then returns to process the next protocol data unit in the decisional step 504.

One skilled in the art should know that the present invention is not limited to receiving protocol data units and then performing virtual segmentation. The present invention may receive and process one protocol data unit and at the same time perform virtual segmentation on a different protocol data unit. Also, other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A routing switch processor, comprising:
a memory;
an input interface configured to receive a protocol data unit and classification information determined from said protocol data unit, said classification information being used to determine a port and associated routing switch processor selected for said protocol data unit;
a protocol data unit receiver subsystem configured to (i) receive from said input interface at least a portion of payload data of said protocol data unit, and routing information associated with said protocol data unit, and (ii) store in said memory said at least a portion of payload data in at least two non-contiguous memory blocks being interleaved with payload data from another different protocol data unit; and
a virtual segmentation subsystem, associated with said protocol data unit receiver subsystem, configured to perform virtual segmentation on said protocol data unit by segmenting said at least a portion of payload data when retrieved without reassembling an entirety of said protocol data unit.

2. The routing switch processor as recited in claim 1 wherein said protocol data unit receiver subsystem further includes:
an assembler subsystem configured to receive said at least a portion of payload data and assemble said protocol data unit; and
a transmit queue subsystem configured to maintain a linked list associated with said protocol data unit, perform a function on said protocol data unit and maintain at least one queue structure for transmission.

3. The routing switch processor as recited in claim 2 wherein said assembler subsystem is further configured to store said at least a portion of payload data in said at least two non-contiguous blocks and said transmit queue subsystem is further configured to maintain a linked list of said at least two non-contiguous blocks.

4. The routing switch processor as recited in claim 1 wherein said virtual segmentation subsystem further includes a stream editor subsystem configured to perform said virtual segmentation.

5. The routing switch processor as recited in claim 4 wherein said stream editor subsystem is further configured to convert between a first protocol and a second protocol.

6. The routing switch processor as recited in claim 4 wherein said stream editor subsystem is further configured to generate a validity check selected from the group consisting of:
a cyclic redundancy check (CRC),
a CRC for asynchronous transfer mode (ATM) adaptive layer 5 (AAL5) over ATM, and
a CRC-10 for operation, administration, maintenance (OAM) cells.

7. The routing switch processor as recited in claim 1 wherein said protocol data unit receiver subsystem and said virtual segmentation subsystem are further configured to process a plurality of interleaved portions of different protocol data units.

8. A method of operating a routing switch processor, comprising:
receiving a protocol data unit and classification information determined from said protocol data unit, said classification information being used to determine a port and associated routing switch processor selected for said protocol data unit;

storing at least a portion of payload data from said protocol data unit in at least two non-contiguous memory blocks being interleaved with payload data from another different protocol data unit; and performing virtual segmentation on said protocol data unit by segmenting said at least a portion of payload data when retrieved without reassembling an entirety of said protocol data unit.

9. The method as recited in claim 8 further comprising:
assembling said protocol data unit with an assembler subsystem; and
maintaining a linked list associated with said protocol data unit, performing a function on said protocol data unit and maintaining at least one queue structure for transmission with a transmit queue subsystem.

10. The method as recited in claim 9 wherein said maintaining said linked list further comprises maintaining a linked list of said at least two non-contiguous blocks.

11. The method as recited in claim 8 wherein said virtual segmentation is performed by a stream editor subsystem.

12. The method as recited in claim 11 wherein said virtual segmentation further comprises converting between a first protocol and a second protocol.

13. The method as recited in claim 11 wherein said virtual segmentation further comprises generating a validity check selected from the group consisting of:
a cyclic redundancy check (CRC),
a CRC for asynchronous transfer mode (ATM) adaptive layer 5 (AAL5) over ATM, and
a CRC-10 for operation, administration, maintenance (OAM) cells.

14. The method as recited in claim 9 wherein said receiving, assembling and performing further comprises processing a plurality of interleaved portions of different protocol data units.

15. A routing switch processor, comprising:
a protocol data unit receiver subsystem including an assembler subsystem and a transmit queue subsystem, said assembler subsystem being configured to:
receive at least a portion of payload data of a protocol data unit, and assemble said protocol data unit, and
receive routing information associated with said protocol data unit, said routing information including a port selected for said protocol data unit;
a memory configured to receive from said assembler subsystem said assembled protocol data unit, and to:
allocate space for said protocol data unit under control of said transmit queue subsystem, and
store said assembled protocol data unit in at least two non-contiguous memory blocks being interleaved with payload data from another different protocol data unit; and
a virtual segmentation subsystem, associated with said protocol data unit receiver subsystem, configured to perform virtual segmentation on said protocol data unit by segmenting said at least a portion of payload data when retrieved, said segmenting independent of reassembling an entirety of said protocol data unit.

16. The routing switch processor as recited in claim 15 wherein said transmit queue subsystem is configured to maintain a linked list associated with said protocol data unit, perform a function on said protocol data unit and maintain at least one queue structure for transmission.

17. The routing switch processor as recited in claim 15 wherein said assembler subsystem is further configured to store said at least a portion of payload data in said at least two non-contiguous blocks and said transmit queue subsystem is further configured to maintain a linked list of said at least two non-contiguous blocks.

18. The routing switch processor as recited in claim 15 wherein said virtual segmentation subsystem further includes a stream editor subsystem configured to perform said virtual segmentation.

19. The routing switch processor as recited in claim 18 wherein said stream editor subsystem is further configured to convert between a first protocol and a second protocol.

20. The routing switch processor as recited in claim 18 wherein said stream editor subsystem is further configured to generate a validity check selected from the group consisting of:
a cyclic redundancy check (CRC),
a CRC for asynchronous transfer mode (ATM) adaptive layer 5 (AAL5) over ATM, and
a CRC-10 for operation, administration, maintenance (OAM) cells.

* * * * *